United States Patent [19]
Long

[11] 3,872,282

[45] Mar. 18, 1975

[54] COPY MACHINE RECORD SYSTEM FOR COST CONTROL

[76] Inventor: John R. Long, 7307 River Hill Rd., Oxon Hill, Md. 20021

[22] Filed: Nov. 8, 1973

[21] Appl. No.: 413,871

[52] U.S. Cl..... 235/925 B, 235/92 CT, 235/92 AC, 235/92 PD, 235/92 R, 355/14, 222/2
[51] Int. Cl........................... B41l 39/02, G07c 3/10
[58] Field of Search ....... 235/92 PD, 92 CT, 92 FL, 235/92 AC, 92 SB, 61.7 B; 222/2; 340/149 A; 355/14

[56] References Cited
UNITED STATES PATENTS

| | | | |
|---|---|---|---|
| 3,252,620 | 5/1966 | Houle et al. .................... | 235/92 FL |
| 3,427,441 | 2/1969 | Swords........................... | 235/92 AC |
| 3,436,530 | 4/1969 | Faude et al..................... | 235/92 PD |
| 3,779,357 | 12/1973 | Haller et al..................... | 235/92 CT |

*Primary Examiner*—Gareth D. Shaw
*Assistant Examiner*—Joseph M. Thesz, Jr
*Attorney, Agent, or Firm*—Herbert E. Farmer; Harold P. Deeley, Jr.

[57] ABSTRACT

A cost accounting system for copying machines, computers, machine tools, printing presses, self-service gasoline pumps and the like is disclosed. A housing containing the accounting system of the instant invention is mounted in close proximity to the machine whose cost of operation is being monitored. One or more modules are mounted within the housing, each module containing a receptacle adapted to receive any one of three portable cassettes which has been assigned to that module, and a plurality of counters, each counter storing a quantity which is a function of the cost of using the machine by a different one of the authorized users of the machine. The base of each receptacle carries a pin which engages a hole disposed in each one of the bases of the three cassettes which has been assigned to the module. Each counter can be activated by only one authorized user to ensure that its count reflects the cost of operation by that particular authorized user. Each authorized user is issued one or more portable cassettes, each containing its own portable counter to also record the cost of use of the machine by that particular authorized user. Each authorizer user's one or more portable cassettes contains its own unique wiring circuit which cooperates with a gating matrix contained in the modules to ensure that the counter mounted in the module which is assigned to that authorized user is activated when that authorized user's portable cassette is inserted in the receptacle mounted in the module. The wiring circuit between each portable cassette and the receptacle also functions as an electrical interlock to prevent use of the machine without insertion of a portable cassette into the receptacle. During the operation of the machine one of the plurality of counters mounted in the module and the counter disposed in the portable cassette are coupled in series with a source of electrical signals found in the machine which is a function of the cost of using the machine so that the count of both counters is a function of the cost of operation.

4 Claims, 3 Drawing Figures

COPY MACHINE RECORD SYSTEM FOR COST CONTROL

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

1. Field of the Invention

The invention relates to accounting systems which allocate the cost of operation of machines such as copying machines, computers, machine tools, printing presses, self-service gasoline pumps and the like to a plurality of authorized users. More particularly, the invention relates to those systems of the aforementioned type which also include an electrical interlock to prevent unauthorized use of the machine.

2. Description of the Prior Art

Commercially available cost allocating systems for copying machines consist of three kinds, namely (a) a device which attaches to the machine having a plurality of counters, each counter storing and displaying the total number of copies made by a different authorized user upon insertion of a metal key into the one key receptacle associated with that particular counter, (b) a similar device but which is activated by a plastic card, and (c) a device which attaches to the copier and contains proper electrical connections which actuate a portable counter which is inserted into a receptacle contained in the device. In this last type of device, the totals for individual authorized users are contained in the portable counter and not in the machine; whereas in the key and plastic card devices, the copy totals are stored and displayed in the counters located in close proximity to each machine.

All three of these devices have a number of inherent disadvantages. In copying machines having plastic card actuated counters, the totals for each organizational element are kept on each copier. To enable any cost center to use any machine would require each copying machine to have as many meters as there are cost centers. As a result, the cost becomes prohibitive and unpopular use restrictions have to be used. In addition, the plastic cards can be easily duplicated. In copying machines having metal key actuated counters, the same disadvantages are present as are found with copy machines having plastic card actuated counters. However, in addition, it is easier to duplicate the keys than the plastic cards. In copying machines having the portable counter system installed, anyone can use the machine; the number of cost centers is unlimited; and the cassettes cannot be duplicated nor rewired interiorly except by authorized personnel. However, since the totalizers are portable and there are no totalizers attached to the copier, it is impossible to know from inspection of the machine location which cost center has been using which machine. These types of data are important for efficient management of machine type, machine location and the number of machines needed.

Faude, et al., U.S. Pat. No. 3,436,530 and Faude, U.S. Pat. No. 3,551,652, relate to systems like the portable counter system described above. These devices have the same inherent disadvantages described in the discussion of the totalizer system.

Samp, U.S. Pat. No. 3,199,729; Miller, et al., U.S. Pat. No. 3,252,621; and Asper U.S. Pat. No. 3,670,924 relate to self-service vending systems used for dispensing petroleum products. The Samp apparatus is used in facilities which include a central control station and a plurality of remote loading stations. At the central control station there are located a plurality of recorders, each recorder storing the cost of a purchase by a different customer of the terminal. Each recorder is key actuated. However, the Samp apparatus, unlike the present invention, requires as many key receptacles as there are recorders. The Miller, et al., apparatus features a plurality of key-actuated recorders and means for operatively connecting selected ones of the recorders to a flow meter or similar means responsive to fluid flow to produce a complete record of the fluid distributed by the mechanism during a given period. However, the Miller, et al., apparatus, unlike the present invention, requires as many key receptacles as there are recorders. The Asper apparatus comprises a dispensing system in which a holder of a key can obtain goods from any dispenser adapted to the system. The key is purchased for a given amount and is ineffective in operating a dispenser after goods have been purchased to the given amount paid. The Asper apparatus does not include recorders which are used to compile a record of the goods purchased for use in preparing a bill.

SUMMARY OF THE DISCLOSURE

The disadvantage and limitations of the prior art are solved by the instant invention which provides a low-cost cost accounting center useful for allocating the cost of machine operation to different authorized users, and which provides machine stored data for efficient management of the machines.

The invention comprises a cost accounting center having a housing mounted in close proximity to the machine whose cost of operation is being allocated between authorized users. The housing has one or more modules mounted therein, each module containing a plurality of counters, each of which registers data to enable the cost of machine operation to be allocated to a different authorized user and a receptacle adapted to receive a portable cassette. Each authorized user is issued one or more portable cassettes which contain a counter for storing the data of machine operation by that particular authorized user. The one or more portable cassettes issued to each authorized user contain a unique wiring circuit which cooperates with a gating matrix disposed in the module upon insertion of the cassette into the receptacle to ensure that the cost of machine operation by a particular user will be stored in the counter mounted in the module which has been assigned to that particular user. The gating matrix disposed in each module comprises a plurality of silicon controlled rectifiers. During operation of the machine by an authorized user, a source of electrical signals which are a function of the cost of operation of the machines is coupled to the counter which stores the data of machine operation for that particular authorized user. The source of electrical signals may be derived from any part of the machine which cyclically draws a surge of current during each operational cycle. However, in the case of machines which do not draw appreciable surges of current, e.g., computers, etc., because of an acyclic mode of operation, the source of electrical signals may be from any periodic pulse source which is activated during the operation of the machine.

The advantages of the instant invention may be summarized as follows. The data of machine operation for an unlimited number of authorized users may be stored at the location of the machine by use of add-on modules, each module adding three record-storage counters activated by one receptacle mounted within the module. Periodic tabulation of the organizational element operation totals from the record-storage counters enables authorized users to allocate their cost of machine operation on a current basis. The unique wiring circuit of each authorized user's portable cassette enables that user to distribute his field of operation to as many machines as needed for desired control. In addition, the cassettes can be made operational only by insertion into the proper receptacle of the proper module through the arrangement of a pin projecting from the base of the receptacle which engages a hold in the base of the cassette. The locations of the pins and holes are so matched that the cassettes and counters are in operation only when properly matched. Since the cassettes are issued only to those persons authorized to use them, the machine use statistics of each authorized user are available at any time from those persons who are in possession of the portable cassettes. Unlike the case of plastic cards or metal keys, the cassettes may be rewired to activate any other counter located within a module. The cassettes may be modified so that the portable counters mounted therein can read in dollars and cents at any predetermined unit cost per machine action producing the pulse. The total of the counters located in the portable cassettes and on the counters disposed in the housing next to the machine may be in units of money or in units of the total number of machine operational cycles.

DETAILED DESCRIPTION OF THE SPECIFICATION

Figure 1:
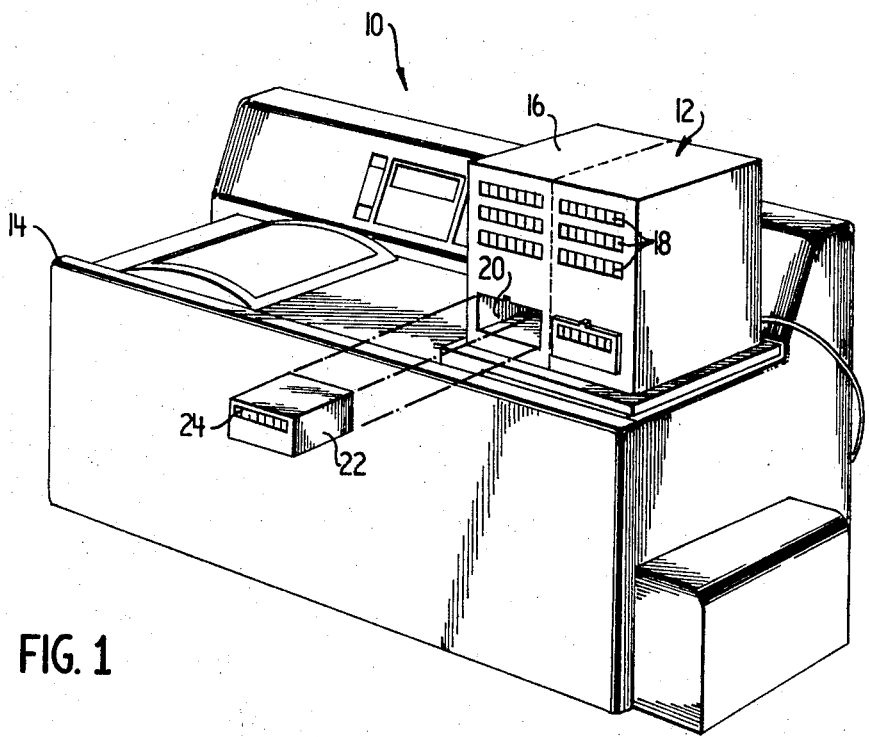
FIG. 1 is a schematic of the present invention as shown in combination with a machine whose cost of operation is being monitored thereby.
Figure 2:
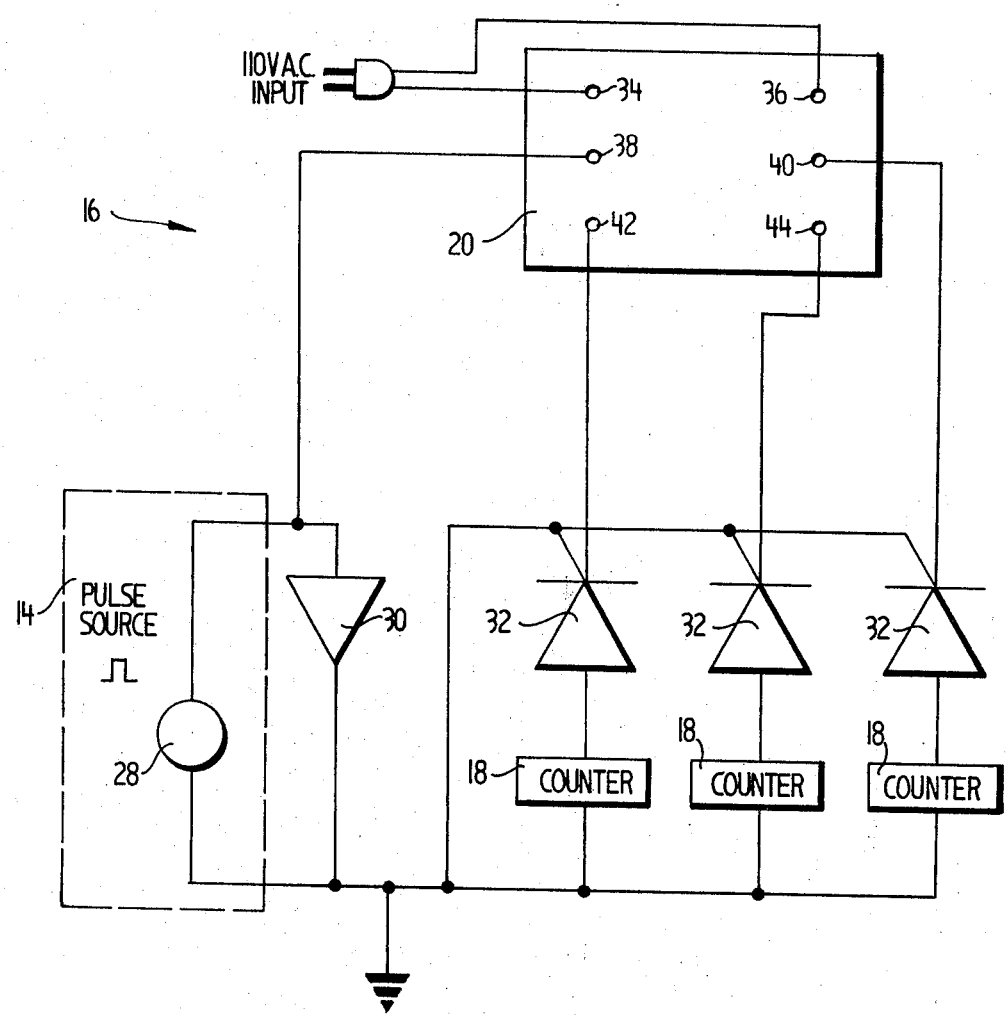
FIG. 2 is a schematic wiring diagram of the individual modules used in constructing the accounting system of the instant invention.

Referring to FIG. 1, numeral 10 designates an accounting system constructed according to the instant invention which comprises a closed housing 12 disposed in close proximity to machine 14 whose cost of operation is being monitored. While in FIG. 1 the machine 14 whose cost of operation is being monitored is shown as a copying machine, it should be understood that the instant invention can equally well be used to monitor the cost of operation of other machines such as machine tools, computers, printing presses, self-service gasoline pumps and the like. Housing 12 contains one or more modules 16 as shown in FIG. 2 which have disposed therein preferably three counters 18, each of which allocates the cost of machine operation to a different authorized user. Each module 16 also contains a receptacle 20 adapted to receive a portable cassette 22 having disposed therein a counter 24 which functions as a portable record of the machine operation by the authorized user who has been assigned that portable cassette 22. It should be understood that each authorized user will be assigned one or more uniquely-wired portable cassettes 22, each of which is capable of being inserted in receptacle 20.

Referring to FIG. 2, each module 16 contains gating matrices which cooperate with each authorized user's one or more portable cassettes to ensure that the counter 18 assigned to that authorized user is activated when the portable cassette 22 assigned to that particular authorized user is inserted into receptacle 20 mounted within housing 12. Pulse source 28 which has been shown with phantom lines surrounding it is actually part of the machine 14 whose cost of operation is being monitored. If machine 14 has a cyclic mode of operation, pulse source 28 may be any part contained therein which draws a current surge during each cycle of operation. On the other hand, if machine 14 has an acyclic mode of operation, pulse source 28 may be any source of repetitive pulses which occur during machine operation. This former type of pulse source would characteristically be found in machines such as a copying machine, while the latter type of pulse source would characteristically be found in machines such as computers. In machines having an A.C. pulse source 28, each module 16 has a diode 30 shunted across the circuit connections coming therefrom. The function of diode 30 is to rectify the electric current produced by pulse source 28. When the pulse current is D.C., i.e., for computers, no diode is needed. It is not the line current surge which activates the counters, but the actual "on-off" pulses from each cycle. The connections to the machine could be any place where pulses are coincident with machine production or operation. Connected in series with each counter 18 is a silicon-controlled rectifier 32 having a gate, an anode, and a cathode. Each of the gate electrodes of the silicon-controlled rectifiers 32 is coupled to one terminal of diode 30 of pulse source 28. Each of the anodes of silicon-controlled rectifiers 32 is coupled to one terminal of a different one of counters 18. The cathodes of each of the silicon-controlled rectifiers 32 are respectively coupled to sockets 40, 42 and 44. Socket 38 is coupled to the other terminal of diode 30 of pulse source 28. For direct current pulses the silicon-controlled rectifier and the counter may be directly connected to the pulse terminals of 28. Sockets 34 and 36 are coupled to the source of line power. Each of the sockets 34, 36, 38, 40, 42 and 44 are disposed within each receptacle 20 found in each of the modules 16. Since sockets 34 and 36 are connected in series with the power circuitry of machine 14, the open circuit condition between sockets 34 and 36 function as an electrical interlock disposed between the power source and the machine for preventing use of the machine by unauthorized users. Each portable cassette 22 comprises an enabling means which upon insertion into receptacle 20 defeats the electrical interlock. In the preferred embodiment of the invention, three cassettes 22 (three enabling means) are assignated to each module 16.

Figure 3:
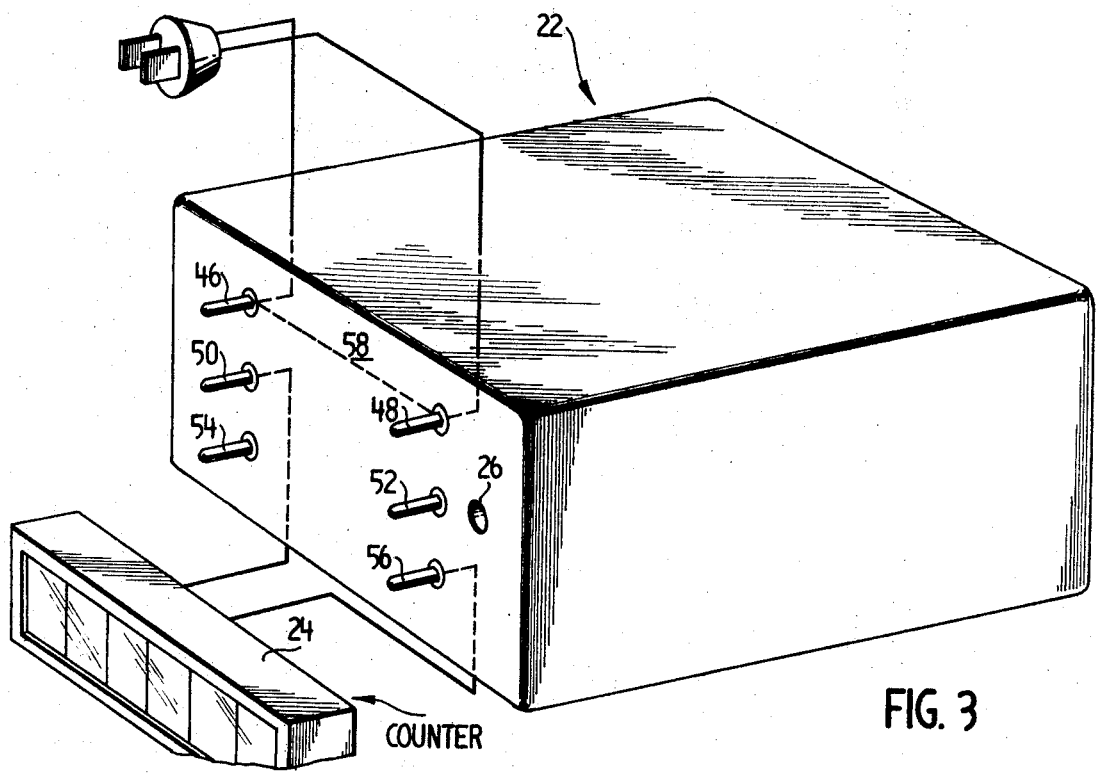
FIG. 3 is a view of the back of a portable cassette used in the instant invention.

Referring to FIG. 3, the back portion of one of the portable cassettes 22 is shown. A plurality of male projections 46, 48, 50, 52, 54 and 56 are adapted to fit into positive engagement with sockets 34, 36, 38, 40, 42 and 44 of each receptacle of each module 16. The top two male projections 46 and 48 have a bus bar disposed between. Bus bar 58 functions as an enabling means for selectively defeating the electrical interlock disposed between receptacles 34 and 36 in modules 16. Upon insertion of portable cassette 22 into receptacle 20, bus bar 58 bridges the open circuit between sockets 34 and 36 of receptacle 20 to complete the power circuit for operating the machine. It should be noted that it is impossible to activate the machine without the insertion of portable cassette 22 into the receptacle 20 as explained above. All of the portable cassettes 22 which are issued to an authorized user have their own unique wiring circuit which is different from the other wiring circuits of the portable cassettes 22 issued to other authorized users. This circuit comprises the connection of counter 24 which is disposed within each portable cassette 22 between male projection 50 and one of the other male projections 52, 54 and 56. Each different authorizer user's cassettes 22 contain their own unique wiring connections of counter 24 between male projections 50, 52, 54 and 56. In the case where each module 22 has three counters 18 mounted therein, the connection of counters 24 in the portable cassettes would be respectively for each different authorized user between male projections 50 and 52, 50 and 54, and 50 and 56. In the case shown in FIG. 3, wherein counter 24 is disposed between male projections 50 and 56, insertion of portable cassette 22 into receptacle 20 would connect male projections 50 and 56 respectively with sockets 38 and 44 of the receptacle 20.

The

The operation of this configuration would be as follows, although it is to be understood that the other configurations of connection of male projections 50 and 52, and 50 and 54 would operate in a similar manner. Insertion of portable cassette 22 into receptacle 20 bridges sockets 34 and 36 found in receptacle 20 with bus bar 58 thus connecting the machine to a source of power. Upon commencement of operation, machine 14 would produce a train of electrical pulses from pulse source 28 which are a function of the cost of operation of the machine. The coupling of pulse source 28 across the cathode and gate of the middle silicon-controlled rectifier 32 would turn on that silicon-controlled rectifier. Because of the characteristic length of the pulses produced from pulse source 28, the first pulse produced thereby which turns on the middle silicon-controlled rectifier would also pass through counter 24 of portable cassette 22, through the anode to cathode junction of the middle silicon-controlled rectifier 32, through the middle counter 18 and back through the pulse source 28. Each pulse produced by pulse source 28 would augment both the counts of counter 24 found within portable cassette 22 and middle counter 18 mounted within module 16. Insertion of a portable cassette 22 issued to a different authorized user having counter 24 connected between male projections 50 and 54 would in a likewise manner activate the left most counter 18 shown in FIG. 2. It should be understood that removal of the portable cassette 22 from receptacle 20 turns off the power source of the machine and the silicon-controlled rectifier which has been activated by the pulse produced by pulse source 28 of the machine being monitored.

It should be understood that the respective counters 18 found within the modules 16 and counters 24 found in the portable cassettes 22 may be calibrated in different units. For example, counters 18 may be calibrated to read in the number of units of machine operation by a particular authorized user, while counters 24 may be calibrated to read the cost of operation to be allocated to that particular user for his total operation of the machine.

It should also be understood that the basic construction of the individual counters, and the cassettes with their built-in counters, per se, form no part of the instant invention as these are commercially available. Each counter may contain a window with six digits for permitting counts from 000,000 to 999,999. A suitable solenoid may be provided within the counter housing of either or both the cassettes and the storage counters for multiplying the count of the counter upon receipt of each pulse from pulse source 28.

In the case where more than one module 16 is provided within housing 12, each receptacle 20 may be provided with means for allowing the insertion of only those portable cassettes 22 (enabling means) which have been assigned to counters contained within that particular module. This means may have a number of different constructions. For instance, as shown in FIG. 3, a hole 26 may be cut out in the base of each of the three cassettes which has been assigned to that module. A corresponding pin (not shown) projects from the base of the receptacle mounted within each module 16. With respect to the base of each of the receptacles, the spatial location of each hole 26 and the corresponding pin is different for each module 16. A key and keyway may also be used with equal facility.

While the invention has been described in terms of having three counters assigned to three different authorized users within each module 16, it should be understood that more than this number of counters may be provided when an additional number of male projections and associated sockets are provided respectively in portable cassettes 22 and receptacles 20. For instance, in the case where eight male projections and associated sockets are provided instead of six as shown as described in the specification, five authorized users may be assigned to each module 16.

While the gating matrix in the embodiment shown in FIG. 2 has been disclosed as using silicon-controlled rectifiers, it should be understood that other equivalent gating circuits may be used with equal facility such as those using "And" gates, etc.

It is therefore to be understood that within the scope of the appended claims the invention may be practiced otherwise than as specifically described herein.

What is claimed as new and desired to be secured by Letters Patent of the United States is:

1. In an accounting device used for allocating the cost of use of machines such as copying machines, computers, machine tools, printing presses, self-service gasoline pumps and the like to respective authorized users thereof, the combination comprising:
   a housing;
   a plurality of counters within said housing, each counter being associated with a different respective authorized user of the machine for storing a quantity which is a function of the cost of operating the machine by that authorized user;
   a source of electrical power for powering said machine;
   an electrical interlock disposed between said source of power and said machine for preventing use of said machine by unauthorized users;

enabling means for selectively defeating said electrical interlock to permit application of electrical power from said power source to said machine, said enabling means being actuatable by only authorized users of said machines;

at least one receptacle disposed in said housing, said one or more receptacles being adapted to receive said enabling means, the number of said receptacles being less than the number of counters disposed within said housing;

a source of electrical signals which are a function of the cost of operating said machine;

means coupled between said source of electrical signals and said plurality of electrical counters for selectively coupling said source of electrical signals which are a function of the cost of using said machine to the respective counter associated with a particular authorized user of the machine when that authorized user inserts said enabling means into said receptacle whereby said plurality of counters allocate the cost of operation of said machine on an authorized user basis;

said enabling means and said means coupled between said source of electrical signals comprising in part:

a plurality of portable cassettes at least equal in number to the number of said counters;

each cassette having a counter disposed therein; and each of said counters being selectively connectable to said source of electrical pulses upon insertion of a different one of said cassettes into said receptacle.

2. An accounting device of the type recited in claim 1 wherein all of said portable cassettes further comprise:

a plurality of pairs of male projections;

a first pair of said male projections in all of said portable cassettes being short-circuited together;

said first pair of projections comprising said enabling means when any one of said portable cassettes is inserted in said receptacle;

a different pair of said remaining pair of male projections in each of said portable cassettes being coupled in series with said counter disposed in said cassette;

upon insertion of said cassette into said receptacle, one of the projections of said different pair of projections being coupled to a first terminal of said electrical pulse source, a second terminal of said electrical pulse source also being coupled to said counter associated with said authorized user, the other of said projections of said different pair of projections also being coupled to said counter associated with said authorized user; and said receptacle further comprising a plurality of pairs of sockets for receiving said male projections, said number of pairs of male projections and female sockets being equal in number.

3. An accounting device as recited in claim 2 wherein a rectifier is connected in parallel with said pulse source to prevent coupling of bipolar pulses from said electrical signal source with one of said plurality of counters disposed in said housing and the counter disposed in said portable cassette which has been inserted into said receptacle.

4. An accounting device as recited in claim 3 further comprising:

a plurality of silicon-controlled rectifiers equal in number to the number of said counters associated with different authorized users of said machine, said silicon-controlled rectifiers having a gate, an anode, and a cathode;

said gate of each of said silicon-controlled rectifiers being coupled to said second terminal of said electrical pulse source;

each of said anodes being coupled to a first terminal of a different one of said counters disposed in said housing;

a second terminal of each of said counters disposed in said housing being coupled to said second terminal of said electrical pulse source; and one of said cathodes of silicon-controlled rectifiers being coupled to said first terminal of said pulse source upon insertion of said cassette into said receptacle.

* * * * *